(12) United States Patent
Treu et al.

(10) Patent No.: US 9,002,368 B2
(45) Date of Patent: Apr. 7, 2015

(54) LOCATING METHOD

(76) Inventors: Georg Treu, München (DE); Axel Küpper, Berlin (DE); Oliver Neukum, München (DE); Claudia Linnhoff-Popien, Landsham (DE)

(*) Notice: Subject to any disclaimer, the term of this patent is extended or adjusted under 35 U.S.C. 154(b) by 870 days.

(21) Appl. No.: 12/671,427

(22) PCT Filed: Jul. 31, 2008

(86) PCT No.: PCT/DE2008/001269
§ 371 (c)(1),
(2), (4) Date: Jun. 17, 2010

(87) PCT Pub. No.: WO2009/015658
PCT Pub. Date: Feb. 5, 2009

(65) Prior Publication Data
US 2010/0285815 A1    Nov. 11, 2010

(30) Foreign Application Priority Data
Jul. 31, 2007   (DE) .......................... 10 2007 035 855

(51) Int. Cl.
*H04W 24/00*    (2009.01)
*H04W 4/02*    (2009.01)
(Continued)

(52) U.S. Cl.
CPC .............. *G01S 5/0263* (2013.01); *G01S 5/0289* (2013.01); *G01S 19/34* (2013.01)

(58) Field of Classification Search
CPC ......... G01S 19/34; G01S 19/48; G01S 19/42; G01S 19/49; G01S 5/0027; G01S 5/02; G01S 19/14; G01S 19/41; G01S 19/47; G01S 19/52; G01S 2205/008; G01S 5/12; G01S 19/06; G01S 19/07; G01S 19/26; G01S 5/0036; G01S 5/0054; G01S 5/0263; G01S 5/0284; H04W 64/00; H04W 4/02; H04W 52/0254; H04W 52/0245; H04L 67/18; G06Q 30/0261; Y02B 60/50; G01C 21/28; H04B 7/18554; H04M 1/72572; H04M 2242/30; H04M 3/42348

USPC .............................................. 455/456.1–457
See application file for complete search history.

(56) References Cited

U.S. PATENT DOCUMENTS 5,412,389 A * 5/1995 Olds ........................ 342/357.21
5,862,511 A * 1/1999 Croyle et al. ................. 701/445
(Continued)

FOREIGN PATENT DOCUMENTS

WO    2007045002 A    4/2007

OTHER PUBLICATIONS

International Searching Authority (ISA/EPO); International Search Report, mailing date Jun. 9, 2009 for International Application PCT/DE2008/001269 (International Publication WO 2009/015658 A3); 12 pages.

(Continued)

*Primary Examiner* — Matthew Sams
(74) *Attorney, Agent, or Firm* — Morris & Kamlay LLP

(57) ABSTRACT

The invention relates to a method for locating a first mobile terminal within a radio network. Said method comprises the following steps: a first locating process is carried out to determine an initial position of the first terminal; the first locating process is deactivated; a second locating process is carried out to at least approximately determine the current position of the first terminal relative to the initial position; and the first locating process is activated and carried out again to determine a new initial position of the first terminal when the current position reaches a minimum distance from the initial position. The invention also relates to a method for determining cliques of mobile terminals in a radio network encompassing a plurality of mobile terminals. Said method comprises the following steps: one or more independent numbers of terminals is determined, each couple of terminals of each of the independent numbers being located at a distance from each other that is greater than a predetermined threshold value; and at least one clique of terminals is determined, the couples of which are located at a shorter distance from each other than a predetermined threshold value, each independent number containing a maximum of one terminal of the clique.

5 Claims, 9 Drawing Sheets

(51) Int. Cl.
*G01S 19/49* (2010.01)
*G01S 19/51* (2010.01)
*G01S 19/34* (2010.01)
*G01S 5/02* (2010.01)

(56) References Cited

U.S. PATENT DOCUMENTS

| | | | |
|---|---|---|---|
| 5,883,594 A * | 3/1999 | Lau | 342/357.63 |
| 5,949,812 A * | 9/1999 | Turney et al. | 375/130 |
| 6,009,375 A * | 12/1999 | Sakumoto et al. | 701/469 |
| 6,021,330 A * | 2/2000 | Vannucci | 455/456.2 |
| 6,141,570 A * | 10/2000 | O'Neill et al. | 455/574 |
| 6,427,077 B1 * | 7/2002 | Alberth et al. | 455/456.1 |
| 6,438,381 B1 * | 8/2002 | Alberth et al. | 455/456.5 |
| 6,542,750 B2 * | 4/2003 | Hendrey et al. | 455/456.1 |
| 6,559,794 B1 * | 5/2003 | Nakajima et al. | 342/357.31 |
| 6,584,331 B2 * | 6/2003 | Ranta | 455/574 |
| 6,664,922 B1 * | 12/2003 | Fan | 342/357.64 |
| 6,774,838 B2 * | 8/2004 | Sun | 342/357.57 |
| 6,975,941 B1 * | 12/2005 | Lau et al. | 701/491 |
| 7,026,984 B1 * | 4/2006 | Thandu et al. | 342/357.74 |
| 7,072,668 B2 * | 7/2006 | Chou | 455/456.1 |
| 7,308,272 B1 * | 12/2007 | Wortham | 455/456.1 |
| 7,456,784 B2 * | 11/2008 | Beason et al. | 342/357.34 |
| 7,471,955 B2 * | 12/2008 | Muramatsu | 455/456.6 |
| 7,589,670 B2 * | 9/2009 | Ochenbauer | 342/357.25 |
| 7,633,389 B2 * | 12/2009 | Mantovani et al. | 340/539.3 |
| 7,664,511 B2 * | 2/2010 | Wang et al. | 455/456.1 |
| 7,724,187 B2 * | 5/2010 | Thandu et al. | 342/357.74 |
| 7,822,546 B2 * | 10/2010 | Lee | 701/412 |
| 8,031,050 B2 * | 10/2011 | Johnson | 340/8.1 |
| 8,072,379 B2 * | 12/2011 | Gopinath | 342/357.74 |
| 8,078,189 B2 * | 12/2011 | Chang et al. | 455/456.1 |
| 2002/0102990 A1 * | 8/2002 | Alberth et al. | 455/456 |
| 2002/0133271 A1 * | 9/2002 | McDermott et al. | 701/1 |
| 2002/0177476 A1 * | 11/2002 | Chou | 455/574 |
| 2003/0222814 A1 * | 12/2003 | Sanchez Gomez | 342/357.01 |
| 2004/0125014 A1 * | 7/2004 | Sun | 342/357.06 |
| 2005/0143090 A1 * | 6/2005 | Dowling | 455/456.1 |
| 2005/0280576 A1 * | 12/2005 | Shemesh et al. | 342/357.1 |
| 2006/0003775 A1 * | 1/2006 | Bull et al. | 455/456.1 |
| 2006/0089154 A1 * | 4/2006 | Laroia et al. | 455/456.2 |
| 2006/0136173 A1 * | 6/2006 | Case et al. | 702/182 |
| 2006/0259241 A1 * | 11/2006 | Nylen | 701/216 |
| 2006/0273960 A1 * | 12/2006 | Murphy et al. | 342/465 |
| 2007/0005243 A1 * | 1/2007 | Horvitz et al. | 701/213 |
| 2008/0012759 A1 * | 1/2008 | Te-Yi | 342/357.06 |
| 2009/0098880 A1 * | 4/2009 | Lindquist | 455/456.1 |
| 2010/0285815 A1 * | 11/2010 | Treu et al. | 455/456.1 |
| 2011/0137813 A1 * | 6/2011 | Stewart | 705/319 |
| 2011/0137814 A1 * | 6/2011 | Stewart | 705/319 |
| 2011/0137995 A1 * | 6/2011 | Stewart | 709/205 |

OTHER PUBLICATIONS

Axel Kuepper et al: "Efficient Proximity and Separation Detection Among Mobile Targets for Supporting Location-Based Community Services" ACM SIGMOBILE Mobile Computing and Communications Review, ACM, New York, NY, US, vol. 10, No. 3, Jan. 1, 2006, pp. 1-12, XP001249176; pp. 1-4 (Abstract Not Available).

* cited by examiner

LOCATING METHOD

CROSS-REFERENCE TO RELATED APPLICATIONS

This application is a U.S. national stage application of PCT application PCT/DE2008/001269, filed Jul. 31, 2008, and claims the benefit of priority from German patent application DE 10 2007 035 855.7, filed Jul. 31, 2007.

BACKGROUND OF THE INVENTION

1. Field of the Invention

The present invention relates to a locating method and a device for carrying it out and, in particular, an efficient control of at least one accurate locating method and at least one energy-saving locating method on a radio-based terminal (e.g. mobile phone) for carrying out proactive, location-based services.

2. Description of the Related Art

Location-based services (LBS's) provide users with information and services according to their whereabouts. While the user is provided with location-based information on request in the case of reactive LBS's, proactive LBS's automatically initiate service actions when predefined spatial events occur, such as when a user is approaching a point of interest (PoI).

While various reactive LBS's are already available, proactive LBS's have until now only been available on a small scale and in a very rudimentary form.

Examples of proactive LBS's are the following services:

Proactive tourist guide: Users are automatically supplied with relevant background information, as soon as they approach a particular landmark.

Child tracker: A child is fitted with a mobile terminal, which informs its parents as soon as it leaves a predetermined zone (e.g. the school playground).

Buddy tracker: Two mobile subscribers are notified when they are close to one another (e.g. in the context of a community service).

The main problem with proactive LBS's until now has been executing them efficiently. This relates in particular to the basic mechanism that affects all proactive LBS's, namely, the automatic detection of whether and when the user either enters or leaves a previously defined geographical zone, hereinafter referred to as the update zone. This should happen with the greatest possible temporal and spatial resolution.

For example, the update zone may be defined as a circle with a predetermined centre and radius or as a polygon.

Various locating methods are conceivable when it comes to achieving a sufficiently accurate spatial resolution, for example, terminal-based methods such as GPS, assisted GPS, the future European satellite system Galileo or the Enhanced Observed Time Difference (E-OTD) method, which is part of the GSM standard. With this method, the user's mobile radio terminal determines its position itself.

Alternatively, network-based locating systems such as Uplink Time Difference of Arrival (U-TDoA) are known, in which the position of the terminal within the network is determined based on radio signals received from the terminal.

Other known locating methods include WLAN and GSM fingerprinting, which can run in network-supported or terminal-based mode, in which the terminal takes signal strength measurements from the surrounding base stations and constantly transmits the measurements to a network server, so that the position can be determined.

The known locating methods have the following disadvantage in relation to the identification of update zones. In order to achieve the high temporal resolution required, the locating method must be operated almost continuously. In some cases this results in high (technical) costs. In the case of terminal-based methods, the continuous position calculation leads to high power consumption by the terminal. In the case of network-based and network-supported methods, signals must again be transmitted constantly from the terminal, which puts a strain on the limited air interface and leads to significant scalability problems. Moreover, the frequent transmissions likewise lead to high energy consumption.

SUMMARY OF THE INVENTION

The problem addressed by the present invention is one of removing or mitigating the disadvantages of the state of the art. This problem is solved by the invention specified in the independent claim. Advantageous embodiments of the invention are specified in the dependent claims and in the following description.

The invention relates to a method for locating a first mobile terminal within a radio network. Said method comprises the following steps: a first locating process is carried out to determine an initial position of the first terminal; the first locating process is deactivated; a second locating process is carried out to at least approximately determine the current position of the first terminal relative to the initial position; and the first locating process is activated and carried out again to determine a new initial position of the first terminal when the current position reaches a minimum distance from the initial position.

The present invention controls an accurate, resource-intensive locating process (the first locating process) such as GPS, for example, for the identification of update zones. The first locating process is used as little as possible during this, in order to conserve the terminal's energy and hardware resources. Nevertheless, the update zones continue to be observed with high temporal and spatial resolution.

The invention comprises, in particular, the assessment of the relative distance along the air line between the current position of the terminal (i.e. of a user) and the last position determined by the first locating process. Location determination by the first locating process is avoided if the update zone has definitely not yet been reached or left or there is a definite probability of this.

The present method can advantageously use the signals from surrounding base stations to dynamically control the deployment of the first locating process.

The present method differs from other ("inaccurate") methods of position determination based on radio signals from surrounding base stations, in that there is only a relative distance assessment and no absolute position determination. The costly incorporation of network topology data or the a priori measurement of fingerprints is thereby avoided.

The present method can be implemented irrespective of equipment. This means that it can easily be integrated into existing terminals with location determination (e.g. GPS units).

The present method can also be advantageously used to determine cliques of mobile terminals within a plurality of mobile terminals.

A method according to the invention for determining cliques of mobile terminals in a radio network encompassing a plurality of mobile terminals comprises steps for determining one or more independent numbers of terminals, wherein the pairs of terminals of each of the independent numbers are located at a distance from each other that is greater than a predetermined threshold value; and for determining at least one clique of terminals, pairs of which are located at a shorter distance from each other than a predetermined threshold value, each independent number containing a maximum of one terminal of the clique.

This method according to the invention is characterised in that cliques can be determined in a simple, energy-efficient manner, which means that existing resources are conserved and communication between the terminals and an overriding server, which is usually available to provide click-based LBS's, can be reduced.

BRIEF DESCRIPTION OF THE DRAWINGS

Embodiments of the invention will now be described with reference to FIGS. 1-9.

DETAILED DESCRIPTION OF EMBODIMENTS OF THE INVENTION

The invention is described below using exemplary and non-limiting embodiments with reference to the drawings.

Efficient Control of Accurate Locating Methods for Detecting Update Zones

Described below is a series of processes according to exemplary embodiments of the invention, with the help of which it is possible to identify when update zones are entered and left with sufficiently high temporal and spatial resolution. This involves selective use of the locating processes described above, so that energy and other resources are conserved.

In other words, the processes described below are based on dynamic control of the locating processes.

Figure 1:
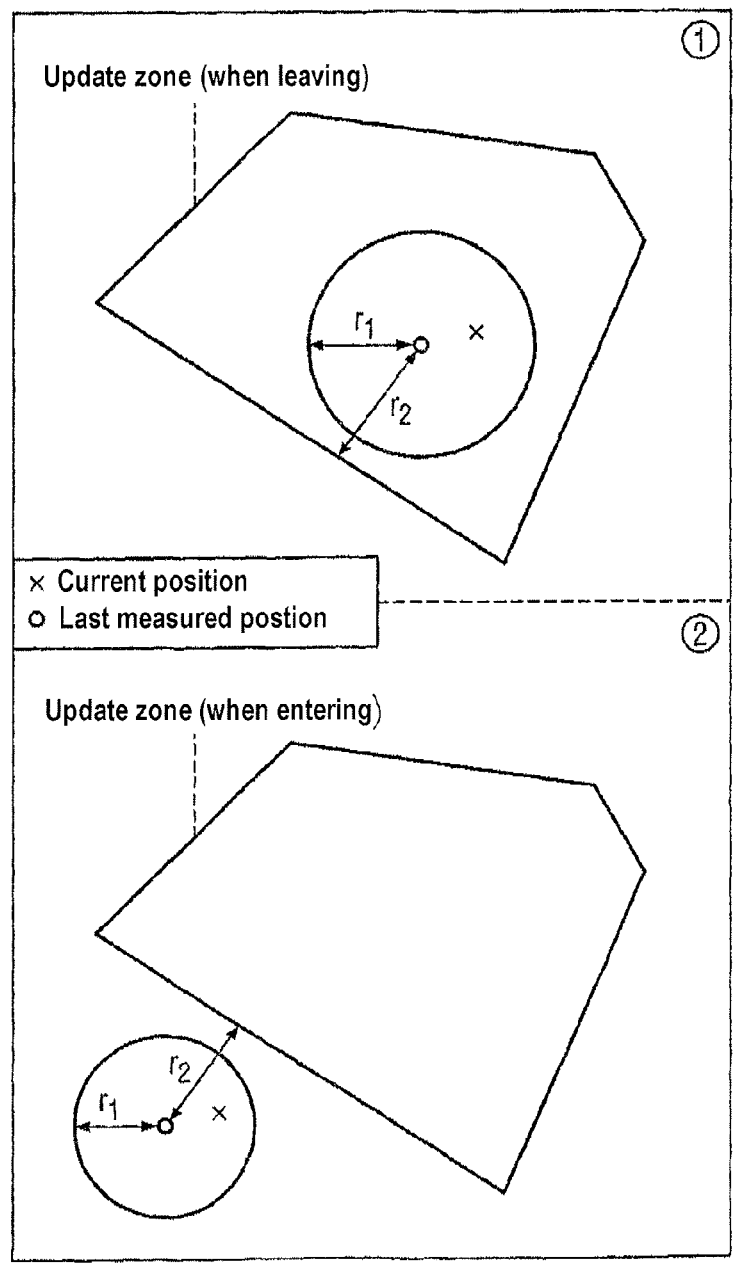

The basic mechanism according to an exemplary embodiment of the present invention is described with the aid of FIG. 1. This shows an update zone U, which is set by a service, the user of a terminal or by the network. The update zone U is assigned to a service, for which it is relevant whether the user leaves or enters the update zone U.

To begin with, the terminal's current position is established using an available "accurate" first locating process (GPS for example). The current position can be used to calculate a distance $r2$, which the user must cover to leave or enter the update zone U.

The invention is based on the first locating process being left until it can be guaranteed that the user has covered no more than distance $r1$ from the time of the last location determination by the first locating process, wherein $r1 < r2$. In this case, the distance $r1$ does not denote the distance actually covered, but the length of the air line between the current position and the last position determined using the first locating process. Only when this is no longer guaranteed is the first locating process reactivated and the process repeated.

The distance $r1$ is determined with the aid of a second locating process. The second locating process is more energy-saving than the first. In other words, an energy-saving locating process is alternated with an accurate locating process.

In a preferred embodiment of the invention, different second (i.e. energy-saving) locating processes are used. Once the user's precise position has been determined using the first locating process, the second locating processes are carried out until none of the second locating processes can determine a distance $r1$ where $r1 < r2$, i.e. until it can no longer be guaranteed that the user has entered or left the update zone. If this eventuality arises, an accurate location determination is carried out using the first locating process and the procedure is repeated.

Various locating processes are described below, which can be used as the second locating process. In this case, a distinction can be made between speed and distance-based processes.

Possible speed-based processes may resemble the known method of dead reckoning. One difference, though, is that dead reckoning directly estimates the user's (absolute) position, based, for example, on the measured speed and direction and also an initial point. However, methods of limiting the relative deviation from the last position are preferred and described below.

Configurable Maximum Speed

This locating process is based on a maximum speed vmax configurable by the user or by a service or determined from the present context or the user's movement history.

Using the maximum speed vmax, a time $t = r1/vmax$ can be calculated for each $r1 < r2$, in which the first locating process can be deactivated.

Determining Acceleration, Speed or Drift Using Radio Signals

In this exemplary embodiment the speed, acceleration, phases and/or frequency drift of the user's terminal are determined in relation to one of the base stations using the signals from surrounding base stations. Such techniques are known per se and are not therefore described in greater detail.

If this process is used, for example, to determine speed using radio signals, distance $r1$ is obtained by integration or summation.

In other embodiments the identifiers of surrounding base stations are monitored by the user's terminal, in order to determine the distance $r1$:

Maximum Radio Cell Radius

If the terminal's maximum range d is known for its radio technology, the terminal cannot have moved by more than $2d$, as long as it is receiving the same base station identifier.

The monitoring of surrounding WLAN access points, for example, is offered accordingly. These only have a limited range. If the terminal receives signals from the same access point in two different positions, it can be concluded that the distance covered $r1$ is relatively small.

This method is also suitable for GSM-based terminals. Although land-based GSM cells measure up to 35 km, here too knowledge of the approximate cell size may be sufficient, if the user only moves over a limited area (e.g. within a city), for example.

This approach is defined by known proximity sensing approaches (e.g. cell ID, which is a known method of location determination in GSM) in that no absolute positions are determined using the cell identifier, but only relative deviations from the position last determined. This results in an independence from network topology information, such as the positions of the base stations, for example, which are usually only available to the network operator.

Inclusion of Quality Features of the Radio Cell

In a preferred embodiment, the signal strength (received signal strength (RSS)), signal quality (signal to noise ratio (SNR)) and/or the bit rate of the signal from the base station are taken into account. If these are above predetermined threshold values, it can be concluded that the terminal is close to the base station. If the values also remain constantly high over several measurements, this provides further confirmation. The user's maximum movement radius, and therefore distance $r1$, can thereby be more accurately determined.

Simultaneous Inclusion of Several Radio Cells

In a further preferred embodiment, the signals from several base stations are taken into account. In this case, a relative path distance is determined based on the difference between two signal strengths from several base stations. No special background information is needed for this (e.g. a priori measurement of fingerprints), which makes the approach far simpler.

Two signal strength vectors determined at different times (one entry per base station and signal strength measured in each case) can be compared, for example, using their Euclidean or Manhattan distance, the number of identical base stations or the Spearman rank order coefficient, which produces a correlation of the tuples of the same base stations classified according to signal strength. Based on these metrics, a maximum path distance between the measuring points can once again be inferred.

Hybrid GPS and GMS Locating Process

Described below is an exemplary embodiment of the invention, in which a GPS-based locating process is used as the first locating process and a GSM-based locating process as the second locating process.

This exemplary embodiment benefits from the fact that the user moves in a semi-static manner most of the time. For example, the user may often move at his or her place of work or at home; however, the user's movements are usually restricted locally, i.e. starting from a fixed central point, the user does not move outside a given radius. For this reason, pure movement recognition is only suitable for the second locating process under certain conditions.

The present exemplary embodiment is therefore based on identifying when this radius is left, so that the first GPS-based locating process can then be activated.

The present exemplary embodiment is based on analysing the signals from surrounding GSM base stations, which are logged by the user's terminal, in order to identify the need for a handover. This does not therefore result in additional energy consumption.

In particular, the terminal's current GSM measurements are compared with those at the time of the last GPS localisation. If this comparison can be used to exclude the possibility that the user has covered more than the above distance r2, the GPS locating method remains inactive.

To this end, different indicators can be used to compare GSM measurements. The Common Base Station (CBS) indicator is particularly suitable for this, due to its simplicity and accuracy.

Below are detailed descriptions of different CBS-based processes for use in embodiments in the present invention. They involve the use of the following parameter designations, among others:

$p_i$: user position at the time of the last measurement using the first (accurate) locating process (e.g. GPS)
$p_j$: user's current position
$\text{dist}(p_i, p_j)$: calculated distance between $p_i$ and $p_j$
$\text{trueDist}(p_i, p_j)$: actual distance between $p_i$ and $p_j$
$\text{dist}_{trigger}$: minimum distance between user and limit of the update zone (corresponds to r2 in the previous description)

Existing Indicators

Figure 2:
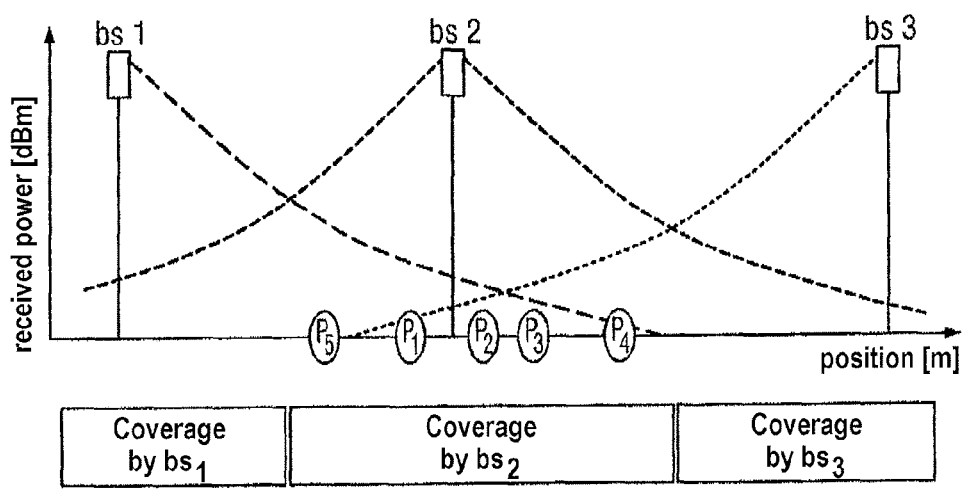

With reference to FIG. 2, a mobile radio terminal, which is in a position $p_j$ at time $t_j$, measures the signal strength $\text{RSS}^{(j)}$ of the N nearest base station $\text{BS}^{(j)}$:

$$BS^{(j)}=\{bs_1^{(j)}, bs_2^{(j)}, \ldots, bs_N^{(j)}\}, C^{(j)}=\{c_1^{(j)}, c_2^{(j)}, \ldots, c_N^{(j)}\}. \tag{1}$$

$bs_a^{(j)}$ is the radio cell ID of the base station a, and $c_a^{(j)}$ is the assigned signal strength, at which the control channel BCCH (Broadcast Control Channel) is received at time $t_j$. In the case of GSM, it is customary for the measurement to be limited to the N=7 strongest base stations, as this corresponds to the number of base stations contained in the measurement report, which a mobile phone transmits to the BSC (Base Station Controller) in dedicated mode, i.e. during a call. There is a multiplicity of methods for comparing two measurements, such as, for example, determining joint base stations with consecutive measurements, determining the Spearman rank order correlation coefficient between two consecutive measurements or the distance between received signal strengths (e.g. the Manhattan and Euclidean distance). These are described, for example, by J. Krumm and K. Hinckley in "The Nearme Wireless Proximity Server", Proceedings of the 6th International Conference Ubiquitous Computing (Ubicomp), 2004, 283-300:

(i) Identification of Joint Base Stations
CBS=length ($BS^{(j)} \cap BS^{(k)}$)
The value of this indicator can easily be calculated. However, this only depicts N+1 discrete values ($n_\cap \in \{0, \ldots N\}$). Moreover, this cannot distinguish between close and more remote antennae.

(ii) Spearman Rank Order Correlation Coefficient
This indicator illustrates how accurately the sequences of joint base stations $BS^{(j)}$ and $BS^{(k)}$ correspond to one another (the sequences usually correspond to falling signal strengths). Although this already represents an improvement compared with (i) on account of the implicit consideration given to signal strengths, it nevertheless has the disadvantage that changes in rank between close and remote antennae are treated proportionally.

(iii) Distance Between Received Signal Strengths
dist ($C^{(j)}, C^{(k)}$)
Common "dist" functions are the Manhattan distance and the Euclidean distance. They both have a higher resolution than (i), but are also more sensitive to influences during signal propagation (e.g. fast fading noise or sudden line of sight effects). Moreover, it is only possible to compare signal strengths from joint base stations.

Expanded CBS Indicator

Described below is the creation of an expanded CBS indicator (eCBS) in accordance with an embodiment of the present invention, which eliminates the disadvantages of existing indicators.

Step 1: Creation of a Weighted Base Station Indicator wBS

The strength of the signal received ci(j) illustrates the importance of the base station i within BS(j). On account of slow and fast fading noise, the signal strength cannot be used as an absolute measurement. Slow fading noise results from reflection and absorption along the signal path between the base station and the mobile radio terminal. Rapid fading noise results from reflective objects in the immediate proximity of the terminal. However, if one considers the proportion of each signal strength value in relation to the total output available, the effect of fading noise can be reduced. Instead of the RSS (Received Signal Strength, see above), weighting coefficients are used:

$$v_i^{(j)} = \frac{N \cdot c_i^{(j)}}{\sum_{a=1}^{N} c_a^{(j)}}. \tag{2}$$

The following results from the measurement in accordance with equation (1):

$$wBS^{(j)} = \{(v_1^{(j)}, bs_1^{(j)}), (v_2^{(j)}, bs_2^{(j)}), \ldots, (v_N^{(j)}, bs_N^{(j)})\}. \quad (3)$$

Step 2: Creation of an Expanded Base Station Indicator eBS

The wBS indicator should balance fading effects that can occur within a single measurement. However, this does not take account of jumping channels (radio cells that appear in one measurement, but in the following one). In order to mitigate the influence of this effect on the indicator, consecutive measurements are weighted (weighted moving average).

The sudden appearance of line of sight (LOS) components makes the measurement $M^{(j)}$ fluctuate. If the LOS radio cell is already present, this has too much weight. On the other hand, if it is not yet present, the remotest cell is forced out of the measurement.

By using a moving window (with a window width Nw), such jumps can be reduced. The expanded base station indicator eBS is thereby determined at time $t^j$ based on the current and Nw-1 preceding measurements $(M^{(j-Nw+1)}, \ldots, M^{(j)})$:

$$M_e^{(j)} = \{(w_1^{(j)}, ebs_1^{(j)}), (w_2^{(j)}, ebs_2^{(j)}), \ldots, (w_L^{(j)}, ebs_L^{(j)})\}. \quad (4)$$

in which L≥N. The expanded base station set $$EBS^{(j)} = \odot_{a=1}^{N_w} BS^{(j-N_w+a)}$$

contains a list of all base stations that were present during the consecutive Nw measurements.

The weightings are calculated as follows:

$$w_i^{(j)} = \frac{1}{N_w} \cdot \sum_{a=1}^{N_w} \sum_{b=1}^{N} v_b^{(a)} \cdot \delta(bs_b^{(a)}, ebs_i^{(j)}), \quad (5)$$

where $\delta(i,j)=1$ at $i=j$, and otherwise 0. Consequently, the average weighting across all Nw measurements is calculated for each $ebs_i^{(j)}$.

Step 3: Calculation of the Number of Joint Base Stations eCBS

The calculation is made based on the following formula:

$$eCBS(M_e^{(ref)}, M_e^{(j)}) = \sum_{a=1}^{L_{ref}} \sum_{b=1}^{L_j} \sqrt{w_a^{(ref)}} \cdot \sqrt{w_b^{(j)}} \cdot \delta\begin{pmatrix} ebs_a^{(ref)}, \\ ebs_b^{(j)} \end{pmatrix}, \quad (6)$$

One advantage of this equation is that the result is not a discrete number made up of N+1 values, but is constant. However, two identical measurements produce eCBS=N. If the weightings are uniform, the result is identical to the traditional CBS indicator.

Observance of the $dist_{trigger}$ Distance

As described above, in order to deactivate the first, accurate (e.g. GPS-based) locating process at time $t_i$, it must be guaranteed that the user has not covered a distance greater than the distance $dist_{trigger}$ at time $t_j$. In order to determine the distance of the user at time $t_j$ from his or her position at time $t_j$, in an embodiment of the invention, as described, the number of joint base stations eCBS is determined. In order to depict the eCBS number at this distance, the following basic methods can be used in accordance with embodiments of the present invention:

1. Map derived from information on the radio network topology (e.g. base station positions, antenna alignment, etc.), combined with models for signal propagation. The map based on this may be supplied to the terminal in advance or as needed (e.g. stored on it).
2. Acquisition of the map by the terminal, for example, using a Bayesian decision system or local regression analysis.
3. Use of a parametric model through parameterisation of the terminal using empirical and area-dependent scale values, particularly by:

Linear map: As this function only comprises two parameters, the connection between eCBS and $dist(p_i, p_j)$ can be established quickly and easily:

$$f_{linear}: dist(p_i, p_j) = q_1 + q_2 \cdot eCBS(M_e^{(i)}, M_e^{(j)}) \quad (7)$$

Map using the hyperbolic tangent: This function represents a good map model, as the form of this function is similar to the form of the data. The calculation is more expensive, compared with linear mapping, but the result is more accurate as a result.

$$f_{tanh}: dist(p_i, p_j) = q_1 - q_2 \cdot atanh\left(\frac{eCBS(M_e^{(i)}, M_e^{(j)}) - q_3}{q_4}\right) \quad (8)$$

The values q1-q4 may, for example, be determined by means of regression analysis.

Along with the distance $dist_{trigger}$ a value p can be determined, which illustrates the probability of $trueDist(p_i, p_j) \geq dist_{trigger}$.

Based on a statistical approach, taking account of the dispersion of a normal distribution qnorm, and the assumption of a Gaussian error distribution $$err(p_i, p_j) := trueDist(p_i, p_j) - dist(p_i, p_j),$$

with a standard deviation σ, the following further distance can be determined:

$$dist_{observe} = dist_{trigger} - \sigma \cdot qnorm(p)$$

If $trueDist(p_i, p_j) = dist_{trigger}$, then $dist(p_i, p_j) < dist_{observe}$ applies with probability p. This means that an eCBS threshold value $eCBS_{thres}$ can be determined as follow:

$$eCBS_{thres} := f^{-1}(dist_{observe})$$

If the currently measured value $eCBS(M^i, M^j)$ is lower than the value $eCBS_{thres}$, the first locating process (GPS) is activated in accordance with an embodiment of the invention, in order to achieve the desired probability p.

The map functions f described above need not be carried out with each GSM measurement, but only when $eCBS_{thres}$ is being redetermined.

In a preferred embodiment it is possible to prestore tables with values of the map functions f in the terminal, so that the terminal does not calculate the map itself and only needs to compare the comparison between the current value of eCBS and $eCBS_{thres}$. Since the map functions are independent of the terminal's hardware parameters, the tables can be calculated and made available independently of the terminal. In other words, the tables can be created for different regions, radio network topographies and/or network operators. The tables can be prestored on the terminal or called up by the terminal (if needed).

Efficient Identification of Spatial Cliques Between Mobile Target Objects

This exemplary embodiment of the present invention relates to the automatic identification of cliques for the realisation and improvement of proactive multi-person Location-Based Community Services (LBCS's).

In graph theory, a clique in a non-directional graph G denotes a number of vertices V, in which all elements are connected in pairs by an edge. V is therefore a fully interconnected subgraph of G. The order of a clique corresponds to the number of vertices contained. Based on the graph-theory definition, a clique $C_n = \{t_1, \ldots, t_n\}$ is regarded as the number of n mobile target individuals (=nodes), in which all possible pairs $t_i, t_j \in C_n$, $i \neq j$ are in close range to one another (=edge). The problem of identifying cliques is defined as follows: A number S of the order s of mobile target persons is given. It should then be automatically identified when a clique $C_n$ of the order $2 \leq n \leq s$ has formed and its composition should be determined.

There are various application fields for the identification of cliques, such as proactive friend alert services, which advise a group of friends (also referred to colloquially as a "clique") of their spatial proximity. Another possibility are mobile, multi-user games, which provide for the identification of cliques as part of the game flow. Another field that not only refers to LBCS's is logistics. In this case, it must be automatically determined when a given number of goods is at the same place. Another area of application is CSCW (Computer Supported Cooperative Work), in which a presentation can be launched, for instance, as soon as a sufficient number of required individuals has gathered for a meeting. The so-called Web 2.0 can also generally profit from mechanisms for the investigation of spatial relationships between community subscribers. Automatic clique identification would, in principle, enhance existing MoSoSo (Mobile Social Software) products, which have hitherto only worked reactively.

In a possible approach for clique identification, the users' terminals could convey the locally measured location information to a location server either periodically or using a fixed update distance. The reported positions are constantly compared at the server end and checked for clique formation. One disadvantage of this approach, however, is the excessive communication, which is higher, the greater the required spatial and temporal accuracy of the clique recognition is intended to be. At the same time, this results in a high calculating load for the location server.

According to an embodiment of the invention, a method is created in which the number of communications exchanged between the terminal and the server is reduced. In particular, the strain on the air interface should be relieved by this, possible monetary costs for the user for using mobile carrier services such as GPRS or UMTS reduced and the terminal's energy consumption resulting from the transmission of communications reduced. In addition, the calculating load on the part of the location server should be reduced, which increases its scalability in relation to terminals that can be used simultaneously.

One method according to an embodiment of the invention is, in contrast to a structural approach, based on proving the non-existence of a clique for as long as the clique does not exist. Based on knowledge acquired from graph theory, this sort of proof is achieved by partitioning the target objects from S into independent sets. An independent set is a subset of S, elements of which are not found in pairs at close range to one another. In order to monitor the validity of the independent sets and check identified cliques for disintegration, close-range and separation identification are used, as described below.

The process for identifying cliques is therefore characterised by the fact that no completely new, specialised protocol for tracking target objects has been designed. Instead, close-range and separation identification is dynamically used on pairs of target objects. Only a few of the possible pairs from S need be simultaneously observed, which sharply reduces the required communications cost.

The method is preferably carried out on a central server, to which the users' terminals are connected.

Clique Identification Strategy

One clique identification strategy in accordance with an embodiment of the invention is based on close-range and separation identification. Close-range identification describes the ability of an LBCS to automatically recognise when the spatial distance of a pair within a group of mobile target objects (users) falls below a predefined close-range distance. Similarly, separation identification denotes the ability to identify that a predefined separation distance between two objects has been exceeded.

For close-range and separation identification, a dynamic, alternating control of a first, accurate locating process (e.g. GPS) and also a second, energy-saving locating process (e.g. GSM-based) is preferably used, as described in detail above. The limit at which the spatial distance of a pair of target objects falls below a predefined close-range distance or exceeds a predefined separation distance thereby corresponds to the limit of the update zone described above. In other words, the first locating process is only activated and carried out when it is no longer guaranteed using the second locating process that a pair of target objects falls below or exceeds the close-range or separation distance.

A graph-based approach that models target individuals as nodes is preferably selected for clique identification. An edge between two nodes means that the spatial distance $\text{dist}(t_i, t_j)$ between the corresponding target persons $t_i$ and $t_j$ is smaller than a predefined clique distance $d_c > 0$. As already mentioned, a clique $C_n$ is a quantity of n in pairs by an edge of connected nodes. This involves a boundary line tolerance $b_c > 0$ associated with the clique identification being introduced: If $d_c \leq \text{dist}(t_i, t_j) \leq d_c + b_c$, then $t_i$ and $t_j$ may be viewed jointly, although they do not have to be. The two target individuals can therefore be allowed as potential candidates for a clique, but this need not be the case.

When a clique is identified, it is then observed in relation to its disintegration, which in turn triggers a corresponding event. For simplicity's sake, as long as a clique exists, none of its elements may be included in other cliques, which are detected during the course of the same enquiry. All cliques formed among the remaining nodes from S must nevertheless still be identified.

This embodiment differs from existing graph algorithms, in that the edges of the graph are not entirely known. Instead of this, proving the existence of an edge requires a separation identification being carried out between the target individuals. If the non-existence of an edge is shown, a corresponding close-range identification must be underway. Both operations generate costs and should be carried out as infrequently as possible as a result.

The present embodiment is based on demonstrably identifying all possible cliques, but at the same time reducing the number of observed pairs of nodes as far as possible. It has emerged that this often only requires a small number of edges to be monitored through close-range identification.

Observation States

Basically, four observational states, between which the presented algorithm changes dynamically according to an embodiment of the invention, can be distinguished for each pair of target individuals:

The "long" state denotes a close-range identification taking place between a pair of target individuals. In this case, the close-range distance $d_p$ is compared to the clique distance $d_c$. The boundary line tolerance of the close-range identification $b_p$ may be set at any value between 0 and the boundary line tolerance $b_c$ associated with the clique identification. The distance of the pair is therefore undoubtedly greater than or equal to $d_c$. This guarantees the non-existence of an edge between corresponding nodes in the graph.

The "short" state means that two target individuals are monitored for separation. In this case, the separation distance $d_s$ is compared to $d_c + b_p$. The boundary line tolerance of the close-range identification $b_s$ is set at $b_c - b_p$. In this way, possible blurring intervals in close-range and separation identification are disjoint. Ping pong effects, which would arise if objects could be observed as close and separate at the same time, are thereby avoided. The distance between two objects, which are in the short observational state relative to each other, is therefore undoubtedly smaller than or equal to $d_s + b_s = d_c + b_p + b_c - b_p = d_c + b_c$. The existence of a corresponding edge can therefore be assumed.

If no information on the spatial relationship between two target individuals is known, the pair is in the "unknown" state. For simplicity's sake, this state is not depicted graphically in the figures.

A pair of target individuals, which is not actively observed, but has nevertheless recently triggered a close-range event, is in the "provisional" state. The purpose of this state is to distinguish pairs, which are presumably in the close range, from others without active separation identification. This should be delayed for as long as possible, in order to avoid unnecessary costs.

Figure 3:
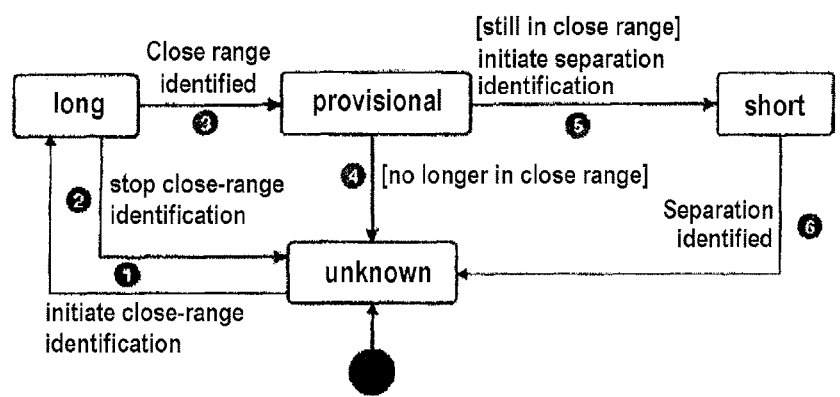

FIG. 3 shows a state transition diagram. According to this, observation of a pair always begins in the "unknown" state. Only the "long" state can be reached from this and this is achieved by initiating close-range identification (1). The long state is either exited, if the close-range identification is explicitly retained (2), which brings about a return to "unknown", or if the pair is identified as being at close range (3). In this case, a transition is made to the "provisional" state. The provisional state is left when the positions of the target individuals are explicitly queried at a later time and once again compared. If they are both then still found in the close range (5), the separation identification is initiated and the state switches over to "short". Otherwise (4), there is a return to "unknown". The only way of exiting the "short" state is a corresponding separation event (6). It leads once again to a restart in the "unknown" state.

Graph Theory Bases

One embodiment of the invention is based on proving the non-existence of a clique, as long, as this has not been created. According to the following findings from graph theory, this sort of proof is possible, even if only a small part of all possible pair relationships are actively observed.

The concept of independent sets is used to show the non-existence of a clique. An independent set is a subset $I \subseteq S$ of variable i, $1 \le i \le s$ of nodes, which are not connected in pairs to an edge. It is therefore known that the target individuals from I are not located in pairs within the close-range distance. Consequently, all possible pairs of an independent set are in the "long" observational state; in other words, close-range identification is activated.

The "chromatic number" or also the "node colouration index" $\gamma(G)$ of a graph G corresponds to the smallest number of colours needed to colour the nodes of G, such that no two nodes connected by an edge are the same colour. $\gamma(G)$ also equals the minimum number of independent sets into which the nodes of G can be divided. The latter is crucial for the desired proof. The statement can easily be seen, in that precisely those nodes with the same colouring are grouped in an independent set.

The clique number $\omega(G)$ of a graph G determines the order of the largest clique in G. It is a fact that the chromatic number of a graph is always greater than or equal to the clique number, $\gamma(G) \ge \omega(G)$; this is easy to reproduce. It is evident that no two nodes of the same independent set are contained in the same clique. Consequently, even the largest clique of a graph can only be made up of a maximum of one node per independent set. Since the minimum number of independent sets is equal to the chromatic number $\gamma(G)$, then $\gamma(G) \ge \omega(G)$.

The algorithm of this embodiment is based on these findings. In order to demonstrate the non-existence of a clique $C_n$ of the order n, the quantity number of all target objects S is divided into n−1 independent sets. If this is possible, it must follow that $n - 1 \ge \gamma(G) \ge \omega(G)$, which excludes cliques of the order n. The conditions of all independent sets are constantly monitored. If a set is made up of only one target individual, no observations need be carried out. Otherwise, the close-range identification ("long" state) must be active for all pairs of target individuals within the set.

Figure 4:
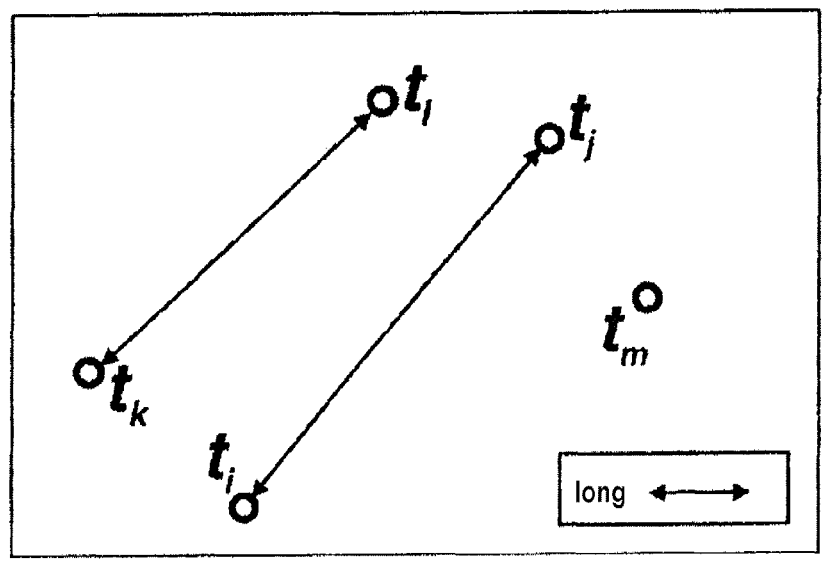

FIG. 4 shows an example in which a clique $C_n$ of the order n=4 is searched for in a number $S = \{t_i, t_j, t_k, t_l, t_m\}$ of s=5 mobile target objects. According to the preceding description, the existence of this sort of clique may be excluded if the five target objects can be divided into three independent sets, as happens in FIG. 4. There is an individual, unobserved target object ($t_m$), which represents a trivial independent set. Moreover, there are two sets which each consist of a pair of objects ($t_i$, $t_j$) and ($t_k$, $t_l$), and are consequently found in the "long" observational state. It should be emphasised at this point that the clique identification for s=n only requires a close-range identification to be underway.

The decision problem of the determination in respect of whether the chromatic number of a graph G lies below a given value k, is NP-hard. For this reason, the algorithm described below does not endeavour always to find the best combination of independent sets. Instead, an approximation with a polynomial computation time is used, which firstly decides whether a division into n−1 independent sets is possible and, secondly, supplies this division. It has emerged that situations in which the approximated algorithm fails are extremely rare. Nevertheless, if such a situation arises, all possible pair relationships from S are monitored (either in the "long" or "short" observational state).

Basic Algorithm for Clique Identification

The algorithm for clique identification according to an embodiment of the invention manages four quantities of pair observations: $S_c$ contains observations in the "short" state, $L_c$ those in the "long" state, $U_c$ those that are "unknown" and $P_c$ the "provisional" observations. The algorithm basically pushes the observations back and forth between these numbers using the state transitions from FIG. 3. Moreover, a number $X_c$, which contains all current independent sets, is managed. The number $Y_c$ contains all current cliques that are smaller than n. As already described, elements of the independent sets contained in $X_c$ are observed in pairs in the "long" state. The pair observations within the cliques from $Y_c$ may be either "short" or "provisional", while use of the "provisional" state is aimed at largely avoiding the cost-intensive separation identification.

Each time a new "short" or "provisional" observation is added, the cliques are reorganised in $Y_c$. Only with this sort of event can the searched-for clique of the order n be identified. A reorganisation of cliques in $Y_c$ is also carried out if a short or provisional observation is removed. In this case, one or more cliques are each divided into smaller cliques.

$X_c$ is always reorganised when new proof based on independent sets is calculated. This is normally the case when an observation is ended in the "long" state on account of a close-range event. As a result of the reorganisation of the independent sets, new "long" observations emerge, which are moved from $U_c$ to $L_c$. Moreover, existing "long" observations, which are no longer needed by any of the new independent sets are discontinued, in other words, transferred from $L_c$ to $U_c$. A detailed description can be found below.

To begin with, the numbers $S_c$, $L_c$ and $P_c$ are empty, and $U_c$ contains all possible pairs from S. $Y_c$ contains s cliques, each of which consists of an individual target object. Accordingly, $X_c$ contains s independent sets, each of which contains a target object. Initial proof of the non-existence of a clique $C_n$ based on independent sets is calculated. As a result, the close-range identification is activated for one or more pairs of target objects, which transfers the corresponding state observations from $U_c$ to $L_c$. $X_c$ now contains n−1 independent sets. The non-existence of the searched-for clique is thereby guaranteed until one of the new "long" observations triggers a close-range event.

The remainder of the algorithm is purely event-driven. For simplicity's sake, all events are sequentialised; in other words, it is assumed that only one event in each case is processed at the same time. A distinction is made between two types of event: identified close-range entrances and divisions between two target objects. A separation event is relatively easy to process, as it cannot result in current proof on non-existence of the searched-for clique being invalid. The only consequences of a separation event are that the corresponding observation is moved from $S_c$ to $U_c$ and one or more cliques from $Y_c$ are split up.

Figure 5:
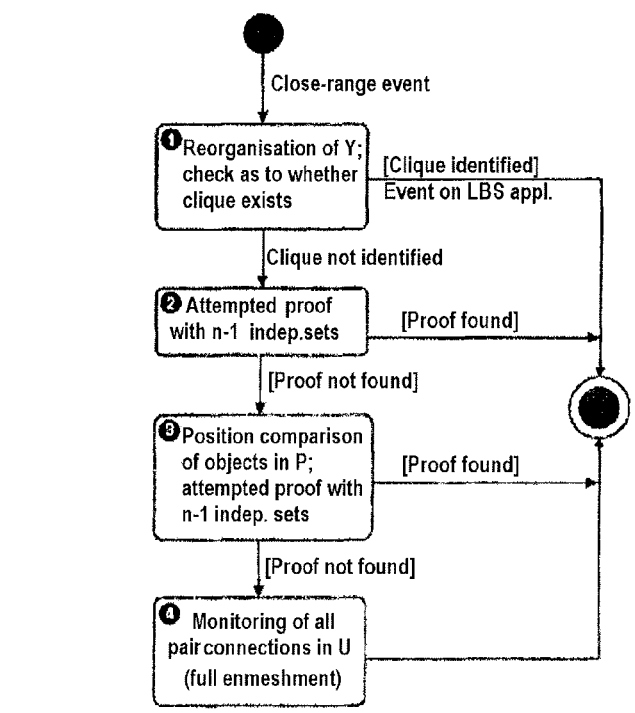

The processing of close-range events, on the other hand, is costlier: If following establishment of the close range between the target objects $t_i$ and $t_j$ an independent set I of the order i exists, which hitherto contains the pair, I is divided into two independent sets: a trivial set, which is made up of either $t_i$ or $t_j$—the target object selected is determined on the basis of a chance function—and also an independent set of the order i−1, which contains the remaining objects from I. The result is that the total number of independent sets in $X_c$ is increased by one and, as a consequence, the non-existence of a clique of the order n is no longer guaranteed. The observation between $t_i$ and $t_j$ is transferred from $L_c$ to $P_c$, and all other observations, which have hitherto combined the separated object with the elements from I, are moved to $U_c$. The following steps, which are also shown in FIG. 5, are then carried out in succession, with each step depending on the failure of its predecessor:

1. The cliques in $Y_c$ are reorganised and a check is made to see whether the edge identified by the close-range event leads to a clique of the order n. If this is the case, a check is made to see whether the clique has pair observations in $P_c$. If necessary, polling is used to check whether the corresponding pairs still satisfy the close-range condition. If the clique is then still obtained, it can be reported to the requesting application. The clique members are then deleted from the list of observed target objects and the procedure is reset.
2. If no clique of the order n can be identified in the first step, a check is made to see whether proof of non-existence is possible through the production of n−1 independent sets (see below), by only using those observations that are currently in $U_c|L_c$. Therefore, there should be no explicit close-range checks that could potentially release observations from $P_c$ to $U_c$ in this step. Corresponding polling is therefore avoided at this point, as it is relatively expensive. So if the production of n−1 independent sets at this point is possible, the corresponding long observations are initialised and the event processing routine can reset.
3. Otherwise, the positions of all target objects that are part of at least one "provisional" pair observation are polled and compared with one another. Depending on the state transitions from FIG. 3, all pairs from $P_c$, which are then still in the close range, are transferred to $S_c$ and actively observed in relation to separation. By contrast, all pairs tested from $P_c$, which have separated from one another in the meantime, are transferred to $U_c$. As a result, $U_c$ now possibly contains more free pairs than before. Another attempt is therefore made to create n−1 independent sets with the help of the pairs contained in $U_c \cup L_c$. If this works, the routine is terminated.
4. As already mentioned, proof based on n−1 independent sets is successful in most cases, which means that this step does not normally need to be carried out. In rare cases, proof is not possible, however, because even after the polling and comparison of the positions of the pairs from $P_c$ there are too few candidates in $U_c$, from which a selection can be made for the long observations required.

Figure 6:
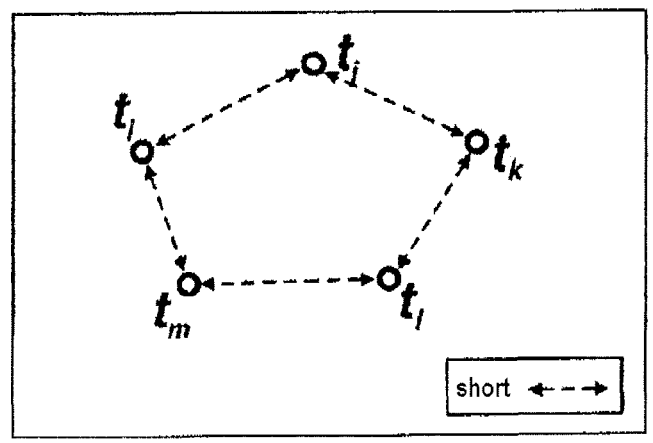

FIG. 6 shows an example in which a clique of the order n=3 is to be identified in a number of s=5 monitored target objects. The non-existence of the clique is demonstrated when the objects can divided into two independent sets, corresponding to a 2-colouration of the graph. However, since the graph contains an odd cycle, as can be seen from the brief observations drawn in, this sort of colouration is impossible.

Figure 7:
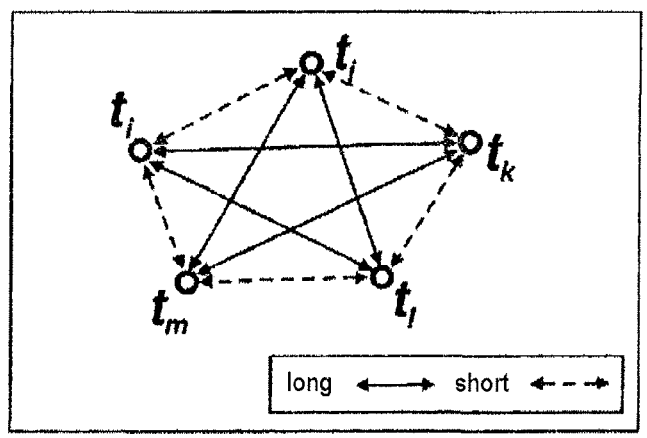

As shown in FIG. 7, the non-existence of the clique can nevertheless be shown—but only in that all pairs remaining in $U_c$ are actively switched for close-range identification, which moves them to $L_c$. All possible edges of the graph are now observed and the procedure can return. Further close-range and separation events are treated as if the proof were based on independent sets. For each additional close-range event, the entire procedure is repeated and an attempt is once again made to generate proof based on independent sets.

Production of n−1 Independent Sets

In steps (2) and (3) of the process described above, attempts are made in each case to reduce the number of independent sets covering the nodes from S to n−1. To this end, two functions are presented below, which can be repeatedly used on the sets contained in $X_c$: "mergers" and "distributions". Both functions are aimed at keeping the fluctuation between quantities $U_c$ and $L_c$ as small as possible. As a result, observations already being carried out should be changed as little as possible, in order to keep down the associated expenditure and computational complexity. Mergers are more efficient than distributions in this case, which is why they are always tried out first. A distribution is only tried if no possible merger can be found. Only when distributions are not possible in step (3) of the basic procedure, is the full intermeshing (4) used.

Merger

A merger receives all existing long observations of the independents sets from $X_c$ and is therefore highly efficient. Two independent sets $I_a$ and $I_b$, for which it is true that all pairs $(I_a \times I_b)$ are included in $U_c \cup L_c$, are in this case selected from $X_c$. These pairs are then transferred into the long observation state $L_c$. This causes $I_a$ and $I_b$ to merge into a single independent set, which reduces the total number of independent sets by one.

Figure 8:
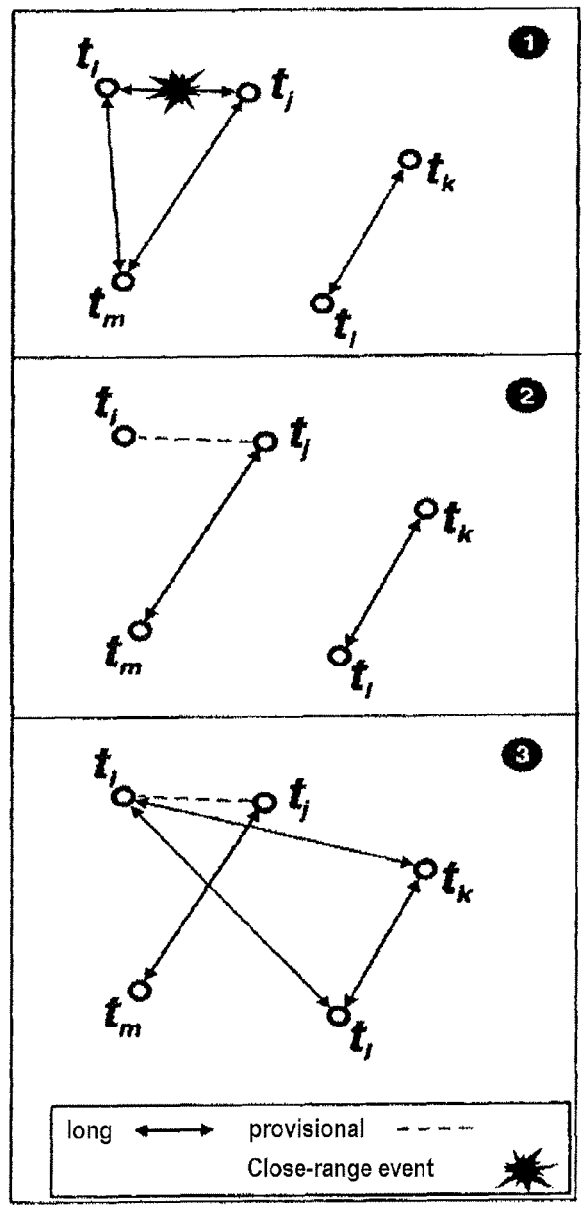

One example is shown in FIG. 8. Initially there are two independent sets $(t_i, t_j, t_m)$ and $(t_k, t_l)$, which guarantee the non-existence of a clique of the order n:=3. However, if a close-range event occurs between $t_i$ and $t_j$ (1), ($t_i$, $t_j$, $t_m$) is partitioned into ($t_i$) and ($t_j$, $t_m$) and three independent sets remain on the playing field (2). As can also be understood from the example, several candidates for a merger are often available (in the example, both ($t_j$, $t_m$)–($t_k$, $t_l$) and also ($t_i$)–($t_k$, $t_l$) can be merged). In the figure ($t_i$)–($t_k$, $t_l$) is chosen (3), and only two independent sets exist again: ($t_i$, $t_k$, $t_l$) and ($t_j$, $t_m$). Non-existence of a clique is therefore guaranteed again until the next close-range event.

Distribution

Distribution is attempted when no two independent sets suitable for merging can be found in $X_c$. In this case, there is therefore at least one "short" or "provisional" observation between all combinations of independent sets. Distributions cause greater expenditure than mergers, since in this case "long" observations are deliberately discontinued. The observations are therefore explicitly moved into the "unknown" state. An independent set $I_a$ can be distributed if there is another independent set $I_b$ from $X_c$ for each of its elements $t_a$, so that no element $t_b \in I_b$ is found in a "short" or "floating" observation of $t_a$. If this condition does not apply, each element of $I_a$ can be absorbed by another set and $I_a$ disappears. This in turn leads to the total number of sets being reduced by one.

Figure 9:
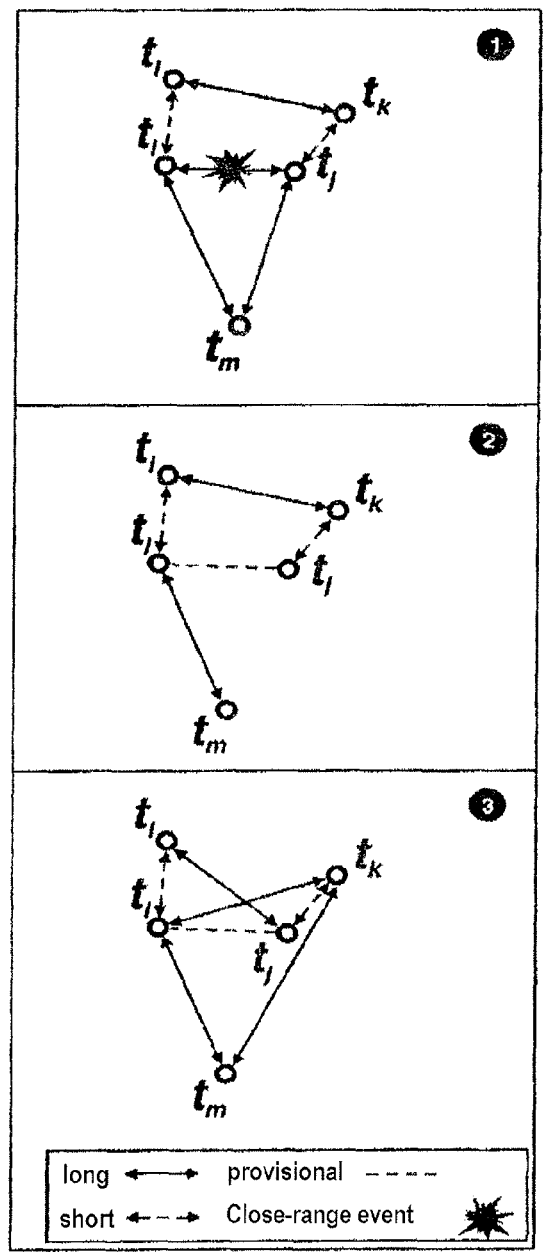

One example of a distribution is shown in FIG. 9. At the start, the independent set ($t_i$, $t_j$, $t_m$) decomposes again into two parts ($t_j$) and ($t_i$, $t_m$), on account of a close-range event between $t_i$ and $t_j$ (1). However, no merger is possible this time, since "short" or "floating" observations (2) exist between each of the remaining three sets. The only possible set of candidates ($t_i$, $t_k$) is therefore distributed: $t_i$ is absorbed by ($t_j$) and $t_k$ by ($t_l$, $t_m$) (3). The non-existence of a 3-clique is thereby guaranteed again.

Substrategies

The use of substrategies is possible according to embodiments of the invention. These relate both to mergers and also distributions. As already mentioned, situations often arise in which more than one pair of independent sets are suitable for a merger or more than one set for a distribution. In deciding which pair or set is selected, two to some extent conflicting goals are possible: One possible objective would be to keep the total number of "long" observations, which are used to show n−1 independent sets, as small as possible. The substrategy associated with this, which is referred to below as "minimum observations", therefore preferably generates small independent sets, as the number of "long" observations rises quadratically with the order of a set. If a merger of two one-element sets and also two two-element sets, for example, is possible in a given situation, the first combination is selected, since it only requires an additional long observation, compared with four new observations in the second case. For distribution, the substrategy with minimum observations always chooses the greatest independent set from among possible candidates, since the greatest number of "long" observations is thereby disintegrated.

The alternative substrategy, which is referred to as "minimum node", tries, however, to reduce the total number of observed target individuals. It is assumed here to be advantageous if a target individual is not observed (which is the case with one-element independent sets) or if a small number of target individuals are subjected to a smaller number of "long" observations. The disadvantage that other target individuals must be monitored more intensively in return should thereby be counterbalanced. The substrategy therefore tries to generate as many one-element independent sets as possible. Mergers that include such sets are therefore avoided wherever possible. In the case of distributions, large absorbing sets are preferably chosen and small sets partitioned.

It should be noted that the embodiments described are only exemplary by nature. Further embodiments, modifications and variations and also advantages of the present invention are recognisable and realisable for those skilled in the art, without having to leave the framework of the present invention.

The invention claimed is:

1. A method for locating a first mobile terminal within a radio network, comprising:
   a first locating process is carried out to determine an initial position of the first terminal;
   the first locating process is deactivated;
   a second locating process is carried out to at least approximately determine the current position of the first terminal relative to the initial position; and
   the first locating process is activated and carried out again to determine a new initial position of the first terminal when the current position reaches a minimum distance from the initial position, wherein the second locating process determines the current position by determining an indicator (eCBS), which depends on the number of joint base stations from which the first terminal receives signals in consecutive passes and/or on quality features of the radio signals, which are received from base stations by the terminal, wherein the indicator (eCBS) is determined using the following formula:

$$eCBS(M_e^{(ref)}, M_e^{(j)}) = \sum_{a=1}^{L_{ref}} \sum_{b=1}^{L_j} \sqrt{w_a^{(ref)}} \cdot \sqrt{w_b^{(j)}} \cdot \delta(ebs_a^{(ref)}, ebs_b^{(j)}),$$

where
eCBS=indicator,
$M_e$=measurements
ref=reference time
j=time at which the second locating process is carried out
L=predetermined natural number N, where
  N=predetermined number of base stations
w=weightings resulting from $$wBS^{(j)} = \{(v_1^{(j)}, bs_1^{(j)}), (v_2^{(j)}, bs_2^{(j)}), \ldots, (v_N^{(j)}, bs_N^{(j)})\}$$

with $$v_i^{(j)} = \frac{N \cdot c_i^{(j)}}{\sum_{a=1}^{N} c_a^{(j)}}$$

where
BS=base stations
c=strength of radio signals from BS
ebs=expanded base station indicators resulting from $$w_i^{(j)} = \frac{1}{N_w} \cdot \sum_{a=1}^{N_w} \sum_{b=1}^{N} v_b^{(a)} \cdot \delta(bs_b^{(a)}, ebs_i^{(j)}).$$

2. A method for locating a first mobile terminal within a radio network, comprising:
   a first locating process is carried out to determine an initial position of the first terminal;

the first locating process is deactivated;
a second locating process is carried out to at least approximately determine the current position of the first terminal relative to the initial position; and
the first locating process is activated and carried out again to determine a new initial position of the first terminal when the current position reaches a minimum distance from the initial position, wherein the current position and/or the distance from the initial position are derived from the indicator (eCBS) by means of a hyperbolic tangent.

3. The method of claim 2, further comprising:
storing a plurality of values of a map function comprising the hyberbolic tangent at the first mobile terminal.

4. The method of claim 3, wherein the values of the map function are independent of hardware parameters of the first mobile terminal.

5. The method of claim 3, wherein the plurality of values of the map function are specific to a region, a radio network topography, or a network operator.

* * * * *